Oct. 9, 1962 E. J. DE WITT 3,057,240
CUT-OFF MACHINE WORK CLAMP
Filed Aug. 15, 1958 4 Sheets-Sheet 1
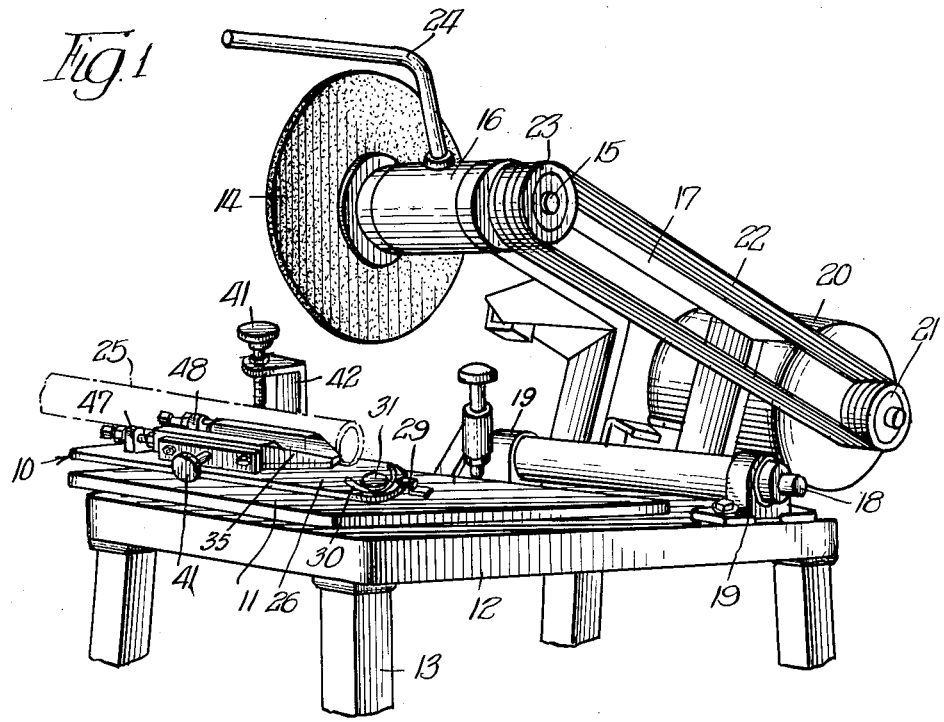
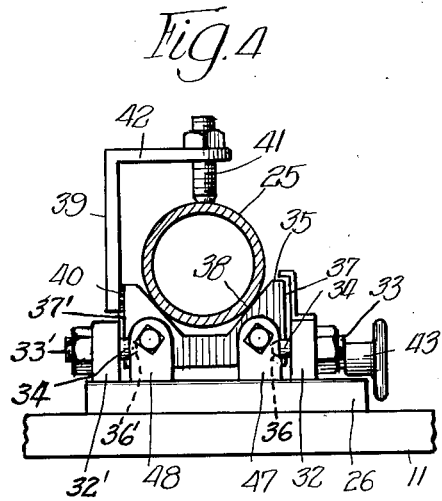
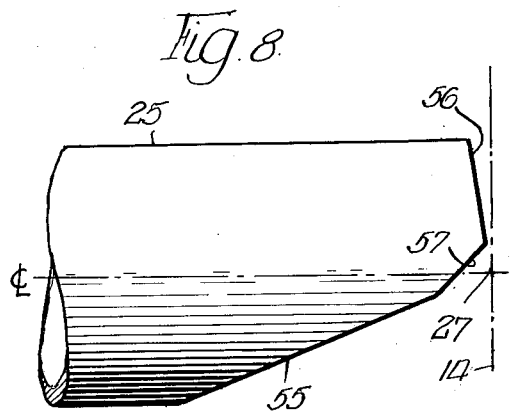
INVENTOR.
Edward J. DeWitt,
BY
Cromwell, Greist + Warden
ATTYS.

Oct. 9, 1962  E. J. DE WITT  3,057,240
CUT-OFF MACHINE WORK CLAMP
Filed Aug. 15, 1958  4 Sheets-Sheet 2
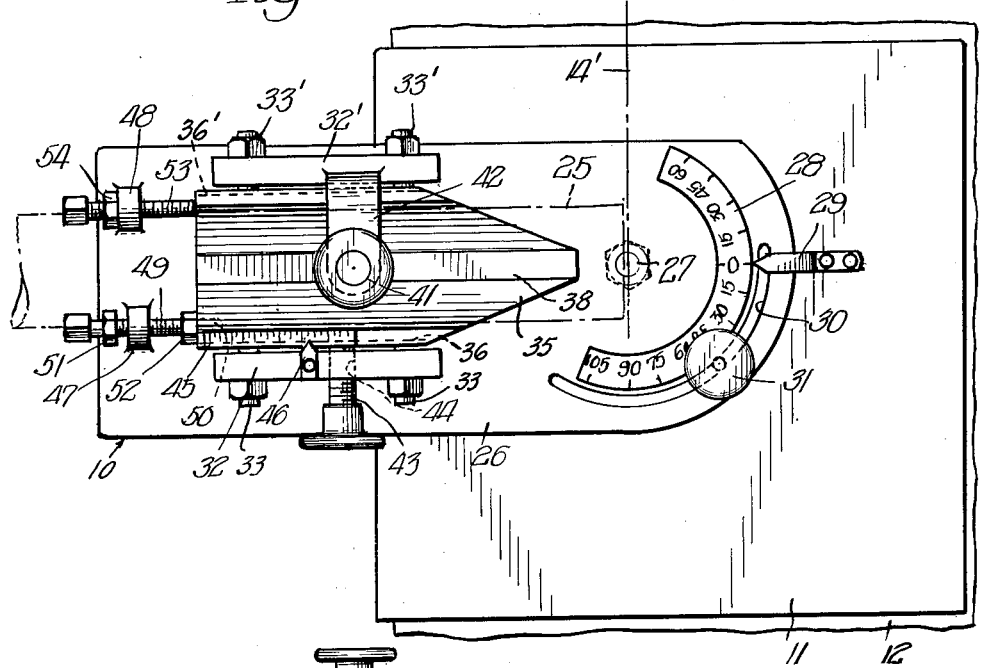
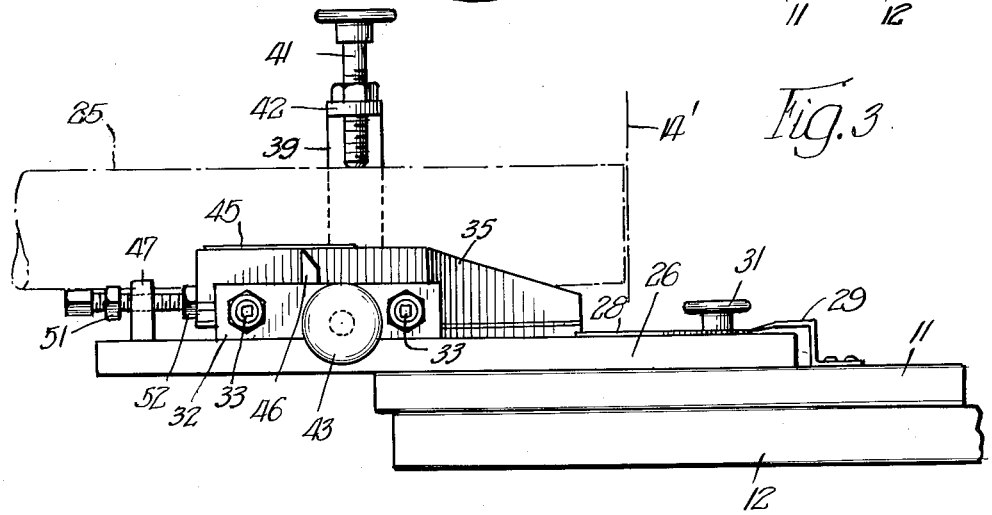
INVENTOR.
Edward J. De Witt,
BY
Cromwell, Greist & Warden
Attys Oct. 9, 1962 E. J. DE WITT 3,057,240
CUT-OFF MACHINE WORK CLAMP
Filed Aug. 15, 1958 4 Sheets-Sheet 3
Fig. 5
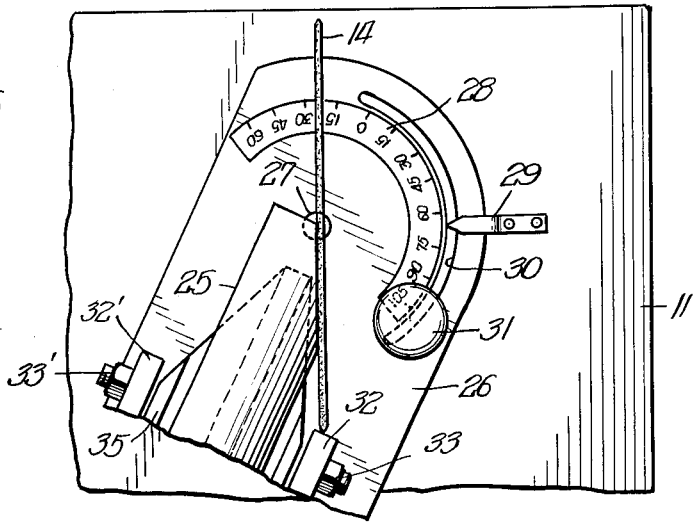
Fig. 6.
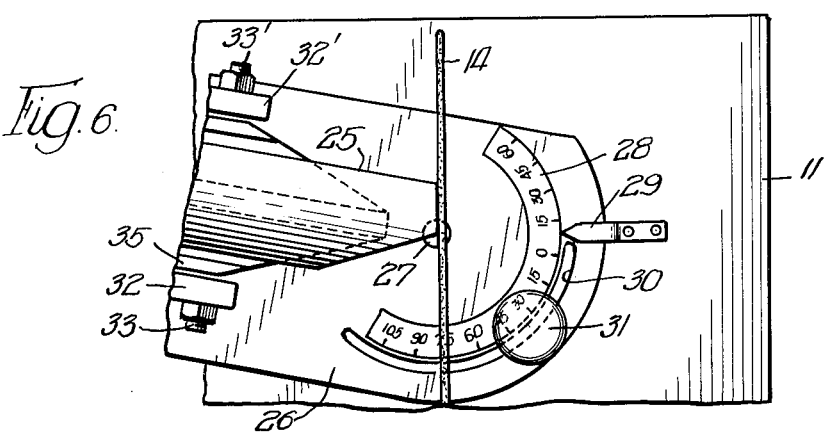
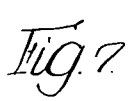
Fig. 7
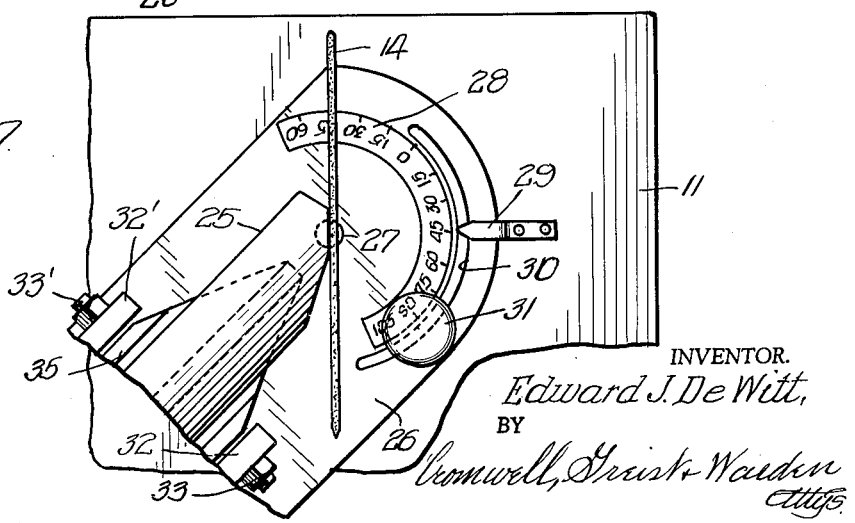
INVENTOR.
Edward J. De Witt,
BY
Cromwell, Greist & Warden
Attys.

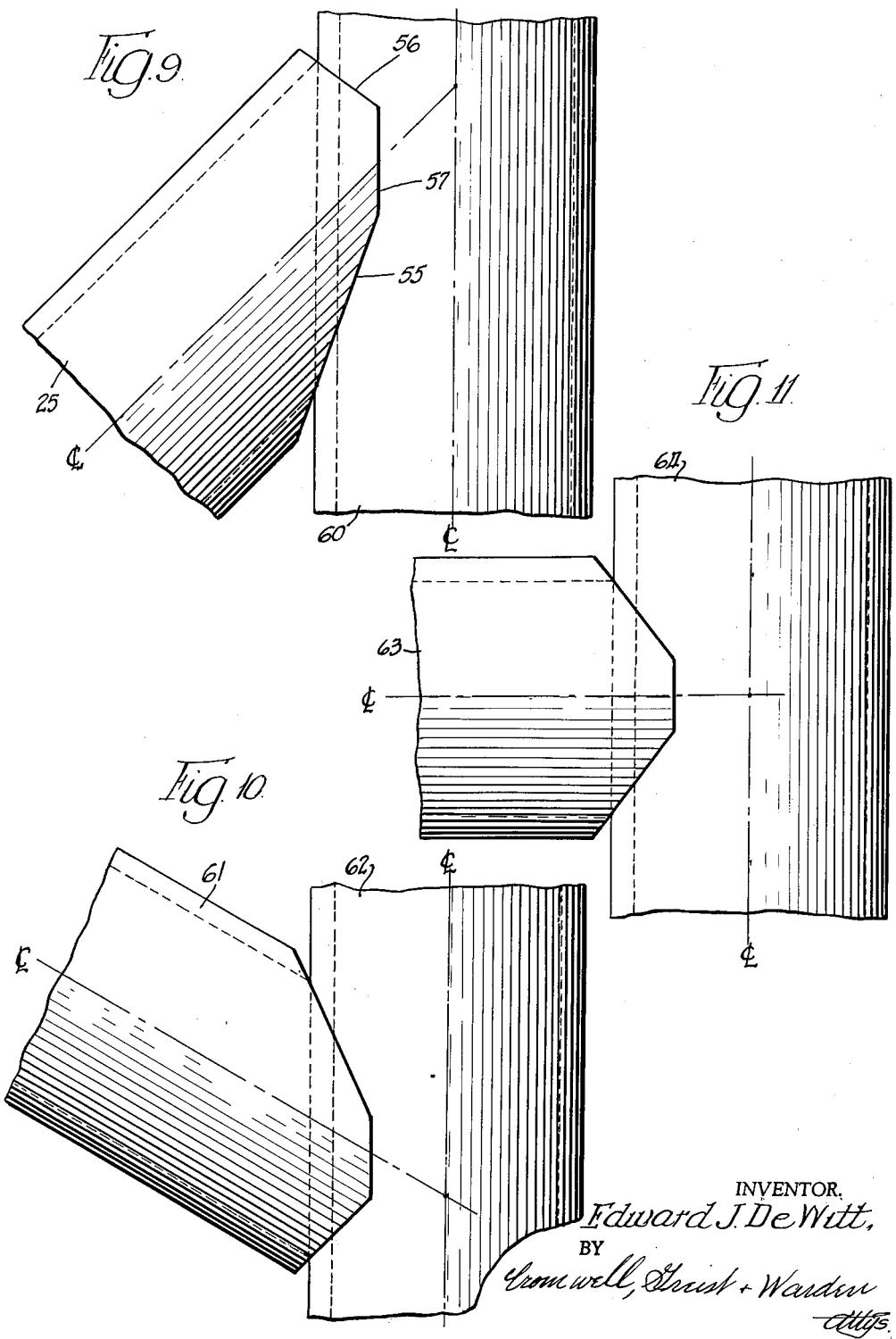

United States Patent Office 3,057,240
Patented Oct. 9, 1962

3,057,240
CUT-OFF MACHINE WORK CLAMP
Edward J. De Witt, Winnetka, Ill., assignor to Wallace Supplies Manufacturing Company, Chicago, Ill., a corporation of Illinois
Filed Aug. 15, 1958, Ser. No. 755,297
4 Claims. (Cl. 83—412)

This invention relates to cut-off machines and is more particularly concerned with improvements in clamp apparatus for holding work pieces on the machine during cut-off operations.

It is a general object of the invention to provide a work holding or clamping apparatus for cooperation with a traveling cut-off tool which is especially adapted for use in preparing the end of a tubular work piece of round or square cross section, for joining, by welding or the like, to the side wall of another tubular member and which enables the user to prepare the end of the work piece so that when it is held against the side wall of the other tubular member mating contact areas result which contact areas are such that a nearly ideal welding condition is provided.

It is a more specific object of the invention to provide a work supporting and clamping device for association with a cut-off tool which permits a work piece to be clamped and rigidly held with its long axis in a plane which intersects the cutting plane of the tool and which clamping device is adjustable so that successive cuts may be made at different angles.

It is a further object of the invention to provide an apparatus for cutting sections of tubular material which enables three cuts to be made across a section with one clamping of the section in a pivoted sliding frame so as to permit the tubular sections to be quickly prepared for the forming of desirable weldable cylindrical intersections of every type within predetermined angular limits.

It is another object of the invention to provide apparatus for holding a length of pipe in predetermined relation to the path of a cutting tool which apparatus comprises a base plate mounted on a pivot having its axis extending in the plane of the cutting tool, track forming members or a slideway on the base, a slide adjustably mounted on the track members or slideway for movement in a direction toward and from the pivot and an adjustable clamp member for securing a length of pipe or other work piece in fixed relation on the slide whereby the slide may be readily adjusted to position the pipe for cutting crosswise of the long axis thereof at predetermined angles thereto and at selected points along the long axis of the work piece.

It is still another object of the invention to provide a work supporting and holding device for association with a cut-off tool which comprises a base plate mounted at one end on a pivot which has its axis extending in the cutting plane of the tool and about which the base plate is adjustable, a track or guideway on the base plate, a work supporting slide member mounted on the track for adjustment along a line extending through the axis of the base plate mounting pivot and an adjustable clamp for securing the work in fixed relation on the slide member.

These and other objects and advantages of the invention will be apparent from a consideration of the apparatus which is shown by way of illustration in the accompanying drawings wherein:

FIGURE 1 is a perspective view of a cut-off saw having mounted on the work table thereof a work supporting and clamping apparatus which incorporates therein the principal features of the invention;

FIGURE 2 is a plan view illustrating the work holding device of the invention;

FIGURE 3 is a side elevation of the apparatus shown in FIGURE 2;

FIGURE 4 is an end elevation of the apparatus shown in FIGURE 2;

FIGURE 5 is a partial plan view of the apparatus adjusted to position a work piece for an angular cross cut;

FIGURE 6 is a fragmentary plan view similar to FIGURE 5 with the apparatus adjusted to another position for a different angular cut;

FIGURE 7 is a fragmentary plan view similar to FIGURE 5 with the apparatus adjusted for a further angular cross cut;

FIGURE 8 is a plan view of the end portion of a piece of pipe, which has been cut as shown in FIGURES 5 to 7;

FIGURE 9 is a plan view to an enlarged scale showing the joint forming portions of two pipes with the end of the one pipe cut as in FIGURE 8 and abutted against the wall of the other pipe in position for welding;

FIGURE 10 is a plan view similar to FIGURE 9 showing the joint forming portions of two pipes with the end of the one pipe cut and abutted against the wall of the other pipe so as to form a joint at a different angle; and FIGURE 11 is a plan view similar to FIGURE 9 showing the joint forming portions of two pipes with the end of the one pipe cut and abutted against the wall of the other pipe so as to form a T joint.

The invention as embodied in the apparatus illustrated in the drawings is employed in connection with a cut-off saw, and is particularly adapted for use in preparing the end of a length of pipe for mating contact with the side wall of another pipe so as to enable the mating surfaces to be joined, as by welding, thereby forming a structural or fluid joint. In preparing the pipe for forming the joint three cuts are made across the pipe with the pipe positioned relative to the cutting plane of the saw blade so as to provide three faces on the cut end of the pipe which are in planes perpendicular to a common plane extending through the long axis of the pipe and which are located in predetermined angular relation to the longitudinal axis of the pipe and at predetermined positions along the same depending upon the angle of the joint and the size and wall thickness of the pipe. The first two cuts are made with the pipe held against rotational and longitudinal movement but swung at predetermined angles relative to the cutting plane of the blade while the third cut through the middle section of the pipe is made with the pipe still held against axial rotation but moved a predetermined distance toward the blade and swung to an angle relative to the cutting plane of the blade which depends upon the angle of the joint.

The present apparatus is designed to position and hold the pipe while the three cuts are made with the pipe located in accordance with a chart or table furnished the operator. Tables have been prepared for cutting pipes of various sizes to form joints at any desired angle which tables show for each joint the angles at which the three cuts are to be made and the distance the pipe is to be moved toward the cutting tool for the middle cut. For a typical joint in which two steel pipes of .125 wall thickness are connected at a 45 degree angle the end of the pipe to be fitted should be cut on planes which are at angles of 63°, 9° and 45°, respectively, relative to the cutting plane of the tool, the latter being normal to the longitudinal axes of the pipe in the zero position thereof and the pipe should be moved toward the cutting plane of the tool a distance of 9/32 inch before making the third or middle cut. The method of determining the values in the tables, that is, the angular position of the pipe for making the cuts and the distance it is to be moved toward the cutting tool for the third cut, forms no part of the present invention, and will not be described.

The clamping apparatus 10 includes a base or mounting plate 11 which is arranged in horizontal position on the top of an upright frame 13, the top 12 normally forming a support for work which is to be cut by the operating blade 14 of the tool. The cutting tool comprises the blade 14 which is mounted on the one end of an arbor 15. The arbor is journaled in a bearing formation 16 on the end of an arm-like supporting bracket 17 which is in turn mounted on the pivot shaft 18, with the latter supported in bearings 19 on the table top 12. The bracket arm 17 carries a drive motor 20 on the end opposite the bearing formation 16 and on the opposite side of the pivot shaft 18 which has its drive pulley 21 connected by the belt 22 with a drive pulley 23 on the end of the arbor 15. An angular bar 24 is connected to the housing 16 for the arbor 15 which forms a handle to be grasped by the operator for manual movement of the arm 17 to bring the cutting blade 14 into engagement with the work piece or length of pipe 25 on the clamping apparatus 10, the blade 14 traveling in a vertical path so that it cuts on a plane which is normal to the horizontal top surface of the work table 12 and which is indicated at 14' in FIGURES 2 and 3.

The clamping apparatus 10 comprises the mounting plate 11 and a swingably connected base plate 26 which has one end thereof mounted on a pivot 27 upstanding from the mounting plate 11. The base plate 26 is in a plane which is parallel with the mounting plate 11 and with the top surface of the work table 12 and is swingable on the vertical pivot 27 about an axis which is in the cutting plane 14'. A semi-circular scale 28 is fixed on the top surface of the pivoted end of the base plate 26 concentric with the pivot 27 and an angular strap forming a pointer 29 is secured on the mounting plate 11 to facilitate adjustment of the base plate 26 to various angular positions on either side of a vertical plane which extends transversely of the table top 12 at right angles to the cutting plane 14' of the blade 14 and which marks the zero position of the base 26. The base 26 is slotted at 30 and a clamping screw 31 cooperates with the slot 30 to hold the base 26 in adjusted angular relation relative to the pivot 27 and the cutting plane 14' of the blade 14.

The base plate 26 is provided with a track which is formed by two laterally spaced upstanding plates or bars 32 and 32' which extend in the longitudinal direction of the base 26 at equally spaced distances on opposite sides of the center line through the pivot 27. The plates 32 and 32' are provided with pairs of longitudinally spaced bolts 33 and 33' having their inner ends 34 and 34' in the form of a truncated cone and providing laterally spaced tracks for receiving a slide member or block 35, the latter having trackway forming grooves 36 and 36' on the oppositely disposed vertical side faces 37 and 37' with the grooves having a cross section corresponding to the shape of the ends 34 and 34' of the track forming members 33 and 33' so as to slidably receive the block member 35.

The slide or block member 35 is provided on its top surface with an upwardly opening groove 38 having upwardly diverging side walls and adapted to form a supporting cradle for the length of pipe 25. The slide plate or block member 35 is provided with a work holding clamp which is in the form of an inverted L-shaped strap having its vertical leg 39 welded or otherwise secured at 40 to the side wall of the slide plate 35 and carrying a clamping screw 41 in a suitably threaded aperture provided in the horizontal leg 42 which overhangs the work receiving groove 38 in the slide plate 35.

The one vertical side plate or bar 32 carries a horizontal and laterally extending clamp screw 43 which extends through a threaded aperture 44 in the plate 32 and engages at its end with the vertical side wall 37 of the slide plate 35 to enable the same to be clamped in adjusted position between the two plates 32 and 32'. The slide plate 35 carries along one side edge a scale 45 and a pointer member 46 is provided on the wall 32 for cooperation with the scale 45.

The base plate 26 carries at its outer end upstanding bracket members 47 and 48. A threaded bolt 49 extends through a horizontal bore in the bracket 47 and has its end seated in a threaded socket 50 in the slide plate 35. The bolt 49 carries stop nuts 51 and 52 which may be adjusted thereon to limit the longitudinal movement of the slide plate 35 in both directions for resetting the same for cutting successive pieces of pipe. A stop bolt 53 is supported in threaded relation in a horizontal bore in the bracket 48 and is provided with a locking nut 54 which permits the bolt 53 to be adjusted so that its end forms a stop abutment to limit the movement of the slide 35 in the direction away from the cutting blade.

The clamp apparatus 10 is adapted to be mounted for use on a cut-off saw or similar tool by securing the mounting plate 11 in any desired manner on the top 12 of the work frame 13 with the pivot 27 in the cutting plane 14' of the blade 14. A piece of pipe 25 may be placed in the groove 38 on the slide plate 35 and clamped in fixed relation to the slide plate 35 by taking up on the clamping screw 41. With the scale 28 set at zero a right angle cross cut may be made on the pipe 25 by adjusting the position of the slide plate 35. The base plate 26 may then be rotated about the pivot 27 to a predetermined angle for making the first cut on the pipe. The desired angle of the cut is set on the scale 28 which positions the base plate 26 as shown in FIGURE 5 and the cut is made across the pipe which severs the pipe on a vertical plane and provides an edge surface, indicated at 55 in FIGURE 8, in the wall of the pipe which is in a single plane but which varies with respect to its angular relation to the surfaces of the pipe wall. The apparatus is adjusted for the second cut by merely swinging the base plate 26 around the pivot 27 to the proper angle at the opposite side without releasing the work piece from the clamp, the second cut being made at the desired angle as shown in FIGURE 6, and resulting in the edge surface indicated at 56 in FIGURE 8. The two cuts thus far made in the pipe provide two intersecting faces 55 and 56, each in a single plane and intersecting on the axis of the pivot 27. The third cut which is made in the pipe end is at an angle to the longitudinal axis of the pipe and also at a point spaced from the intersection of the planes of the two cuts already made. To position the pipe for this third and last cut, the pipe carrying slide plate 35 is adjusted toward the cut-off plane 14' a predetermined amount which may be measured on the scale 45. The base plate 26 is then set at the required angle for making the third cut and the cut is made as illustrated in FIGURE 7 to provide the third edge face indicated at 57 in FIGURE 8. The three cuts being completed, the pipe 25 may be removed from the clamp 10. The same cuts may be duplicated on successive pieces of pipe by proper setting of the stop nuts 51 and 52 and repetition of the cutting operations.

When the pipe section 25 has been cut to provide the three edge surfaces or faces 55, 56 and 57 it is in condition for making the welded joint, requiring only that it be positioned in end abutting relation against the side wall of the pipe 60 as shown in FIGURE 9 with the angle subtended between the longitudinal axes of the pipes corresponding to the angle for which the pipe 25 has been cut and the two pipes may then be permanently connected as by welding or the like according to the procedure set forth in my co-pending application Serial No. 755,296, filed concurrently herewith.

Pipe sections may be prepared for forming joints of any desired angle by cutting the pipe so as to provide the end with three plane edge faces at the proper angle and in the proper position relative to each other. The pipe section 61 is cut as shown in FIGURE 10 to form an angle of 60 degrees with the pipe section 62, to which it is adapted to be joined. The pipe section 63 is cut as shown in FIGURE 11 to form a T joint with the pipe section 64 to which it is adapted to be joined.

While specific materials and particular details of construction have been referred to in describing the illustrated form of the apparatus, it will be understood that other materials and different details of construction may be resorted to within the spirit of the invention.

I claim:

1. A work clamping device for a material cutting machine of the type which has a horizontally disposed work supporting table and a traveling cutting blade mounted for movement in a predetermined plane which is normal to the work table, said work holding device comprising a base adapted to be mounted at one end thereof for movement on a vertical pivot axis on the work table, which is in the plane of the cutting blade, spaced oppositely disposed horizontal track formations upstanding on said base which terminate short of said pivot axis, a slide mounted on said track formations for horizontal movement toward and from said pivot axis, said slide having an upwardly opening, longitudinally extending cradle forming recess for receiving therein a cylindrical work piece, work engaging clamp means on said slide for securing said work piece in said recess, clamp means adapted to hold said base at adjusted angular positions on the work table so as to locate the work piece for cutting crosswise thereof at selected angles relative to the cutting plane, and clamp means adapted to hold said slide at selected points along the track formations whereby the work piece may be moved longitudinally while the work piece is clamped in fixed relation on said slide.

2. A work holding clamp device adapted to be mounted on a machine for cutting elongate work members either crosswise or at an angle to the long axis thereof, which machine includes a work supporting table and a rotating cutting blade mounted for movement in a perdetermined plane which is normal to the work supporting surface of the table, said work holding clamp device being adapted to be mounted on the work table of the machine and comprising a base forming portion having means to mount the same on the work supporting surface of the work table for movement about a pivot which is located in the plane of the cutting blade, means for holding said base forming portion in selected angular positions, a track formation on said base portion having its longitudinal axis lying in a plane transverse to the plane of the cutting blade and through the axis of said pivot, a slide mounted on said track formation for longitudinal sliding movement toward and from said pivot, means including an adjustable screw on said slide for securing a work piece thereon with its longitudinal axis parallel with the corresponding axis of said slide, and a clamping screw on said track formation for securing said slide in fixed relation on said base portion whereby said clamp device may be adjusted to position the work piece for cutting crosswise thereof at selected angles and at selected points along the longitudinal axis of the work piece while the work piece is held in fixed relation on said slide.

3. A work holding device adapted to be mounted on a cut-off machine of the type which is characterized by a cutting blade mounted to travel in a predetermined path for cutting on a plane coincident with the path of travel thereof, said work holding device comprising an elongate plate-like base member having means for mounting the same for rotation about an axis at one end thereof which is adapted to be located in the cutting plane of the blade, said base member having means for securing the same in selected angular positions relative to said axis, a track formation on the other end of said base member, a slide member having a guideway for cooperation with said track formation, said track formation and said guideway being constructed to permit movement of said slide member in a linear path which is normal to the axis of rotation of the base member, means for securing the slide member in selected positions along its linear path, said slide member having an upwardly opening cradle-like recess for receiving a cylindrical work piece with its long axis parallel to the path of movement of said slide member, a work clamping bracket on said slide member having a portion overhanging said recess and an adjustable work engaging screw mounted in vertically disposed relation in said overhanging portion, and a screw mounted in said base member and engageable with said slide member to secure said slide member against movement relative to said base member.

4. A work holding device as recited in claim 3 and adjustable stop members on said base member for engaging the end of said slide member remote from the axis of rotation of said base member to limit the movement of said slide member relative to said base member.

References Cited in the file of this patent

UNITED STATES PATENTS

| 5,523 | Markam | Apr. 18, 1848 |
| 185,117 | Mason | Dec. 5, 1876 |
| 242,972 | Penrose | June 14, 1881 |
| 794,737 | Peer | July 18, 1905 |
| 914,299 | McCarthy | Mar. 2, 1909 |
| 2,064,539 | Hart | Dec. 15, 1936 |
| 2,835,964 | Yarwood | May 27, 1958 |

FOREIGN PATENTS

| 98 of 1911 | Great Britain | Jan. 2, 1912 |
| 528,992 | Italy | June 17, 1955 |